United States Patent
Baxter et al.

(10) Patent No.: US 9,982,819 B2
(45) Date of Patent: May 29, 2018

(54) TUBE SEAL ASSEMBLY

(71) Applicant: Caterpillar Inc., Peoria, IL (US)

(72) Inventors: Corey Baxter, Lafayette, IN (US); Trevor Pease, Lafayette, IN (US); Mark Meyer, Pendleton, IN (US)

(73) Assignee: Catepillar Inc., Deerfield, IL (US)

(*) Notice: Subject to any disclaimer, the term of this patent is extended or adjusted under 35 U.S.C. 154(b) by 595 days.

(21) Appl. No.: 14/627,141

(22) Filed: Feb. 20, 2015

(65) Prior Publication Data

US 2016/0245440 A1 Aug. 25, 2016

(51) Int. Cl.
| | |
|---|---|
| F16L 21/04 | (2006.01) |
| F16L 37/091 | (2006.01) |
| F16L 23/02 | (2006.01) |
| F16L 23/18 | (2006.01) |

(52) U.S. Cl.
CPC ............ *F16L 21/04* (2013.01); *F16L 23/02* (2013.01); *F16L 23/18* (2013.01); *F16L 37/091* (2013.01)

(58) Field of Classification Search
CPC . F16L 23/02; F16L 23/18; F16L 21/04; F16L 37/091
USPC .......... 285/379, 340, 321, 364, 368, 39, 337
See application file for complete search history.

(56) References Cited

U.S. PATENT DOCUMENTS

| | | | |
|---|---|---|---|
| 4,188,051 A | 2/1980 | Burge | |
| 6,565,125 B2 * | 5/2003 | Robison, Jr. | 285/340 X |
| 6,623,046 B1 * | 9/2003 | Fritz | 285/917 X |
| 7,125,054 B2 * | 10/2006 | Jones | F16L 21/04 |
| | | | 285/337 X |
| 7,434,847 B2 | 10/2008 | Densel et al. | |
| 8,186,723 B2 | 5/2012 | Kim | |
| 8,545,244 B2 | 10/2013 | Nicholson et al. | |
| 2010/0194104 A1 * | 8/2010 | Hennemann | F16L 37/091 |
| 2011/0210543 A1 * | 9/2011 | German | F16L 21/04 |
| | | | 285/337 X |

OTHER PUBLICATIONS

Technical Manual, Straub the Right Connection; Switzerland, 2012.

* cited by examiner

*Primary Examiner* — Gregory J Binda
*Assistant Examiner* — Zachary T Dragicevich
(74) *Attorney, Agent, or Firm* — Baker Hostetler; Hibshman Claim Construction PLLC

(57) ABSTRACT

A tube seal assembly is provided to connect a tube and an adapter in order to circulate a fluid. The tube seal assembly can include various components such as a locking flange, a tube retainer, a seal guard, and an elastomeric seal. Bolts are used to secure the components of tube seal assembly together through the use of a load and to secure the tube seal assembly to the second tube. Teeth on the tube retainer are angled to dig into the first tube to prevent the tube from separating from the adapter during a blowout. The tube seal assembly can be configured to connect to any existing tube in order to be more serviceable in the field.

20 Claims, 6 Drawing Sheets

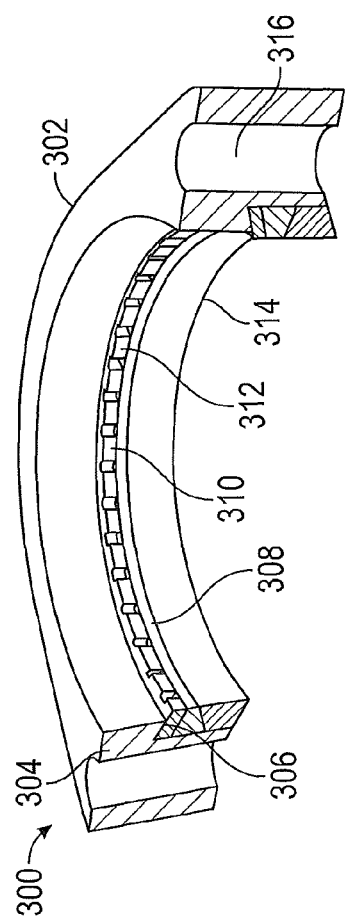
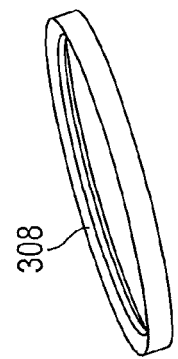
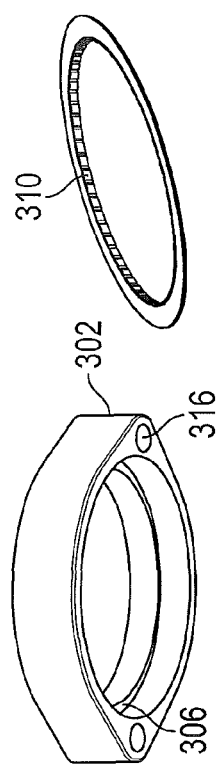
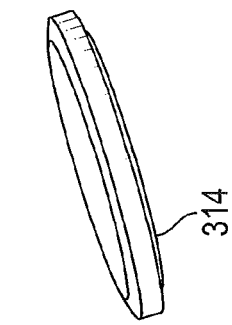
FIG. 3A
FIG. 3B
FIG. 3C
FIG. 3D
FIG. 3E

TUBE SEAL ASSEMBLY

TECHNICAL FIELD

The disclosure relates to an assembly, and more specifically, a tube seal assembly having a locking flange.

BACKGROUND

Modern day engines require fluids and gases that are circulated in hoses or tubes in order to function properly. For example, engines typically operate at a high temperature and often require some type of fluid in order to keep the engine at the proper operating temperature. Hoses and tubes are used in the engine in order to circulate fluids, such as a coolant to keep the engine cool. Hoses and tubes in an engine are typically connected together using various devices such as a clamp. However, clamps are prone to fluid leaks and are inadequate when it comes to a blowout, which results from fluids being transmitted or circulated under high pressure. When the fluid leaks at the clamps or due to a blowout, engine downtime is required to make the necessary repairs. Further, if the engine is still under warranty, the original equipment manufacturer would have to absorb the repair costs. Additionally, if the clamp does not provide a proper seal then dirt and debris may enter the coolant system and contaminate the engine leading to additional costs.

U.S. Pat. No. 8,186,723 discloses a pipe fixing system, comprising a cylindrical body having a tapering part inside therein whose diameter is narrower from the bottom to the top and which thus has a sloping inner surface, an entry provided on top of the body and having a bolt portion, a fixing chip provided on the inner side of the tapering part and having a bolt portion extending from the upper part toward the lower part in its center, and a teeth profile on the surface contacting a pipe, and a bolt passing through the bolt portion of the entry and that of the fixing chip, in order to fix the pipe in a secure way and also to connect/disconnect the pipe easily and rapidly. (Abstract). By having a tapering part, costs of producing the fixing system are added unnecessarily. Further, this system includes complicated parts that make it difficult to be field serviceable.

Thus, there is a need for an improved connector, such as a tube seal assembly that prevents fluid leaks and provides adequate blowout protection for fluids circulated under pressure. Further, there is a need for improved connector that can be field serviceable including being retrofitable and resistant to contamination.

SUMMARY

In one aspect, a tube seal assembly for connecting a tube is provided and includes an elastomeric seal configured to provide a seal between first tube and an adapter, a tube retainer having at least one tooth configured to mate with the tube, the at least one tooth being moveable from a first angle to a second angle during assembling, a seal guard configured to protect the elastomeric seal from being damaged by the at least one tooth, a locking flange having a shoulder and a bolt receiving portion, wherein the elastomeric seal, tube retainer and seal guard are positioned under the shoulder of the locking flange, and a bolt configured to fit in the bolt receiving portion and apply a load to the shoulder of locking flange.

In another aspect, a tube seal assembly for connecting a tube with an adapter that includes an elastomeric seal configured to provide a seal between first tube and the adapter, wherein the elastomeric seal receives the tube, a tube retainer having at least one tooth that mates with the first tube, the at least one tooth being angleable from a first angle to a second angle during an insertion of the tube into the adapter, a seal guard configured to protect the elastomeric seal from being damaged by the at least one tooth and to receive the tube, a locking flange having a shoulder and a bolt receiving portion, the locking flange receives the tube, wherein the elastomeric seal, tube retainer and seal guard are positioned under the shoulder of the locking flange, and a bolt configured to fit in the bolt receiving portion and apply a load to the shoulder of locking flange, wherein the tube seal assembly and the bolt are positioned on a same axis as the first tube and adapter.

BRIEF DESCRIPTION OF THE DRAWINGS

FIG. 3A illustrates a cross section of a tube seal assembly according to an aspect of the disclosure.

FIG. 3B illustrates a perspective view of a locking flange according to an aspect of the disclosure.

FIG. 3C illustrates a perspective view of a tube retainer according to an aspect of the disclosure.

FIG. 3D illustrates a perspective view of a seal guard according to an aspect of the disclosure.

FIG. 3E illustrates a perspective view of an elastomeric seal according to an aspect of the disclosure.

DETAILED DESCRIPTION

Figure 1:
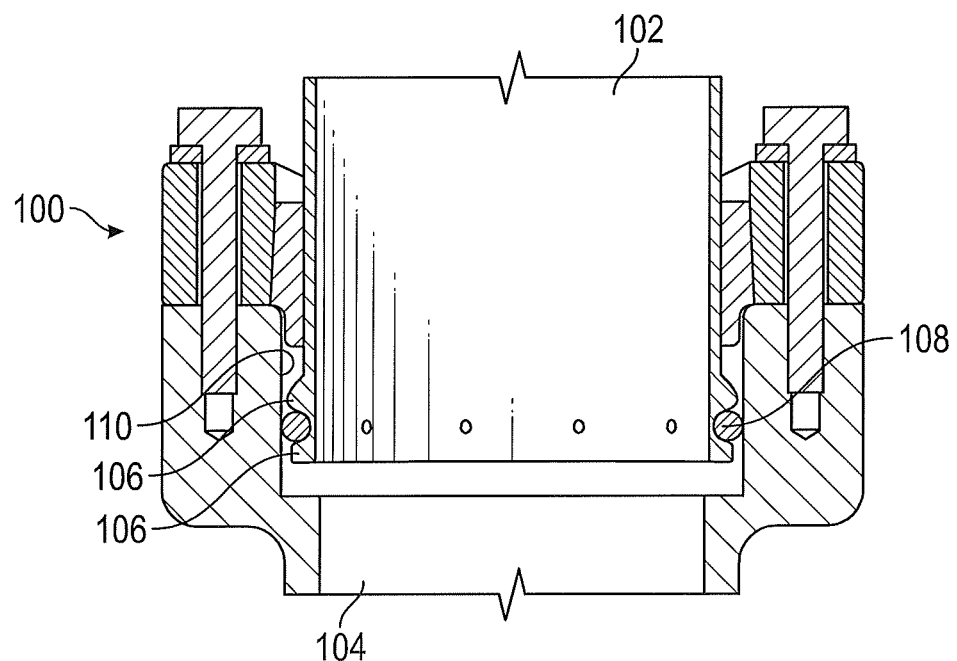
FIG. 1 illustrates a prior art system that includes a double upset formed at an end of a tube.

FIG. 1 illustrates a prior art system 100 that includes a double upset 106 formed at an end of a tube 102. The system 100 is designed to allow the tube 102 to be received in the adapter 104 in order to be coupled together. The tube 102 has the double upset 106 formed at its end and having an elastomeric seal 108 positioned between the double upset 106. The double upset 106 and the elastomeric seal 108 together form a sealing surface against the bore 110 of the adapter 104. The double upset 106 can be formed during production of the tube 102 or during conventional field repairs. Regardless of when the double upset 106 is formed, time and costs are associated with such formation, thereby increasing the cost of the original or replacement tubes.

The elastomeric seal 108 and the double upset 106 of the system 100 are highly susceptible to wear and alignment issues that result from use over an extended period of time. Once the double upset 106 or the elastomeric seal 108 fails, the system 100 will leak causing downtime of the engine and an unnecessary warranty repairs.

Figure 2:
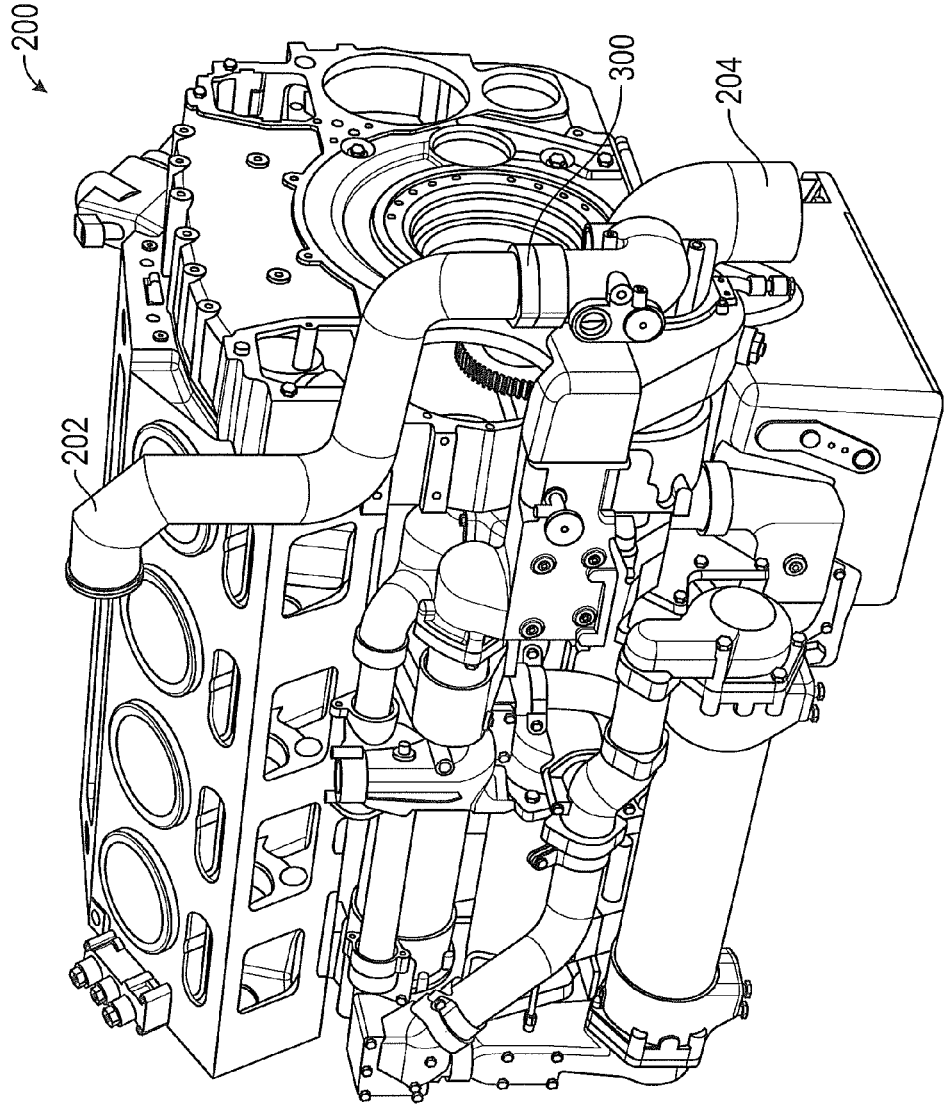
FIG. 2 illustrates an engine of the vehicle having the tube seal assembly according to an aspect of the disclosure.

FIG. 2 illustrates an engine 200 of the vehicle having the tube seal assembly 300 according to an aspect of the disclosure. During operation of the engine 200, the temperature of the engine will increase and needs to be maintained at the proper operating temperature through the use of circulated cooling fluids. The cooling fluids can be circulated using various hoses and tubes, such as coolant tube or tube 202 that is connected to a main coolant connection or adapter 204 with the tube seal assembly 300, which is further discussed below.

FIG. 3 illustrates a cross section of tube seal assembly 300 and its various components according to an aspect of the disclosure. The components include a locking flange 302, a tube retainer 310, a seal guard 308 and an elastomeric seal 314. The locking flange 302 retains the entire tube seal assembly 300 together by applying a predetermined amount of load to the tube retainer 310, the seal guard 308 and the elastomeric seal 314. The locking flange 302 includes bolt receiving portion 316 that can receive bolts 318 (FIG. 4). The bolts 318 are configured to couple the tube seal assembly 300 to the adapter 204 in order to properly connect tube 202 to the adapter 204. The locking flange 302 can be made of any material including grey iron, steel or other alloys. In one aspect, the locking flange 302 may be swivelly connected together at one portion so that instead of sliding over one of the tube during installation, it can swivel open and then swivel close around the relevant tube. In another aspect, the locking flange can be cut so that (because it can be made from a malleable material) the locking flange can be opened and bent around the tube 202. The locking flange 302 includes a shoulder 306 that can apply the predetermined load provided by bolts 318 to the tube retainer 310, the seal guard 308 and the elastomeric seal 314.

Figure 4A:
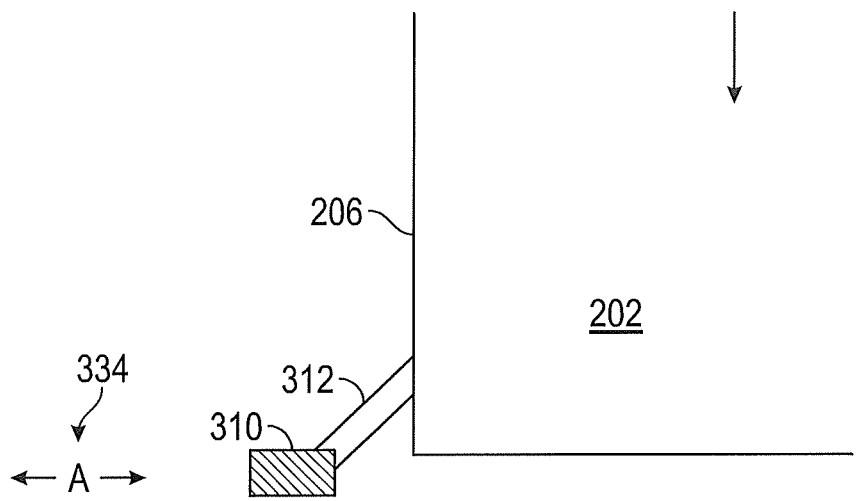
FIG. 4A illustrates a cross section of tube retainer with the teeth at an angle above the plane according to an aspect of the disclosure.
Figure 4B:
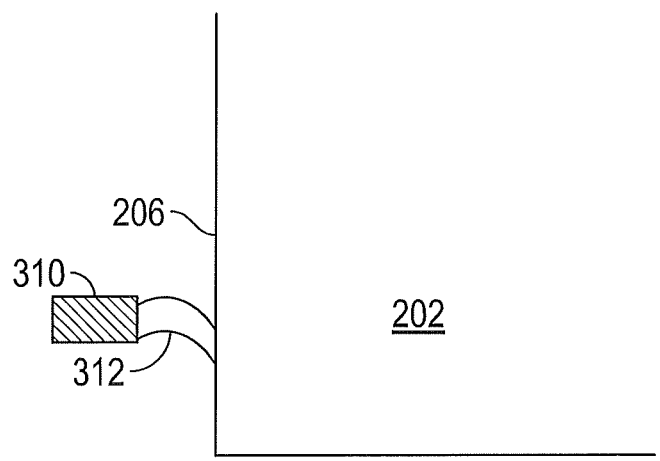
FIG. 4B illustrates a cross section of tube retainer with the teeth at an angle below the plane according to an aspect of the disclosure.

The tube retainer 310 is configured to include at least one tooth or a plurality of teeth 312 that prevents the tube 202 from separating from adapter 204 during a blowout. In one aspect, the teeth may be angled at various angles, such as from 5° to 80° above or below relative to a plane 334 (FIG. 4A) defined by the tube retainer 310 when installed. Turning to FIGS. 4A and 4B, in one aspect of the disclosure, the teeth 312 are angled, for example at 20° to 60° above the plane 334 so that when the tube 202 is inserted therein, the angled teeth 312 makes contact with the tube's outer surface 206. Then, as the tube is further inserted, the teeth 312 being relatively malleable can be bent or deformed so that the teeth below the plane 334 (FIG. 4B) from about 20° to 60° depending on the final movements of the tube when installed. This allows for better contact of the teeth 312 with the tube's outer surface 206 in order to better prevent separation of the tube 202 from the adapter 204 during a blowout. In another aspect of the disclosure, the plurality of teeth 312 may be angled at a fixed predetermined angle from, for example, 20° to 60° above or below the plane 334.

Blowouts can occur because the tube and the adapter are under pressure as the fluid is circulated in the tubes. The teeth 312 as previously noted can be configured to angle in a downward direction (relative to the plane) in order to "dig" into the tube 202 when the tube 202 starts to move in a first direction away from adapter 204 during the blowout. That is, when a blowout causes the tube 202 to move in the first direction, the movement of the tube 202 causes the downwardly angled teeth 312 to "dig" further into the outer surface 206 of the tube 202. Once dug in, the teeth 312 prevents the tube 202 from separating from adapter 204 during a blowout. The tube retainer 310 may be made from any material including stainless steel, metal, and other alloys. Further, the tube retainer 310 may have upper and lower surfaces that are generally flat. In one aspect, similar to the locking flange 302, the tube retainer 310 may be swivelly connected together at one portion so that instead of sliding over one of the tube during installation, it can swivel open and then swivel close around the relevant tube during installation. In another aspect, the tube retainer 310 can be cut so that (because it can be made from a malleable material) the tube retainer can be opened and bent around the tube 202.

Figure 5A:
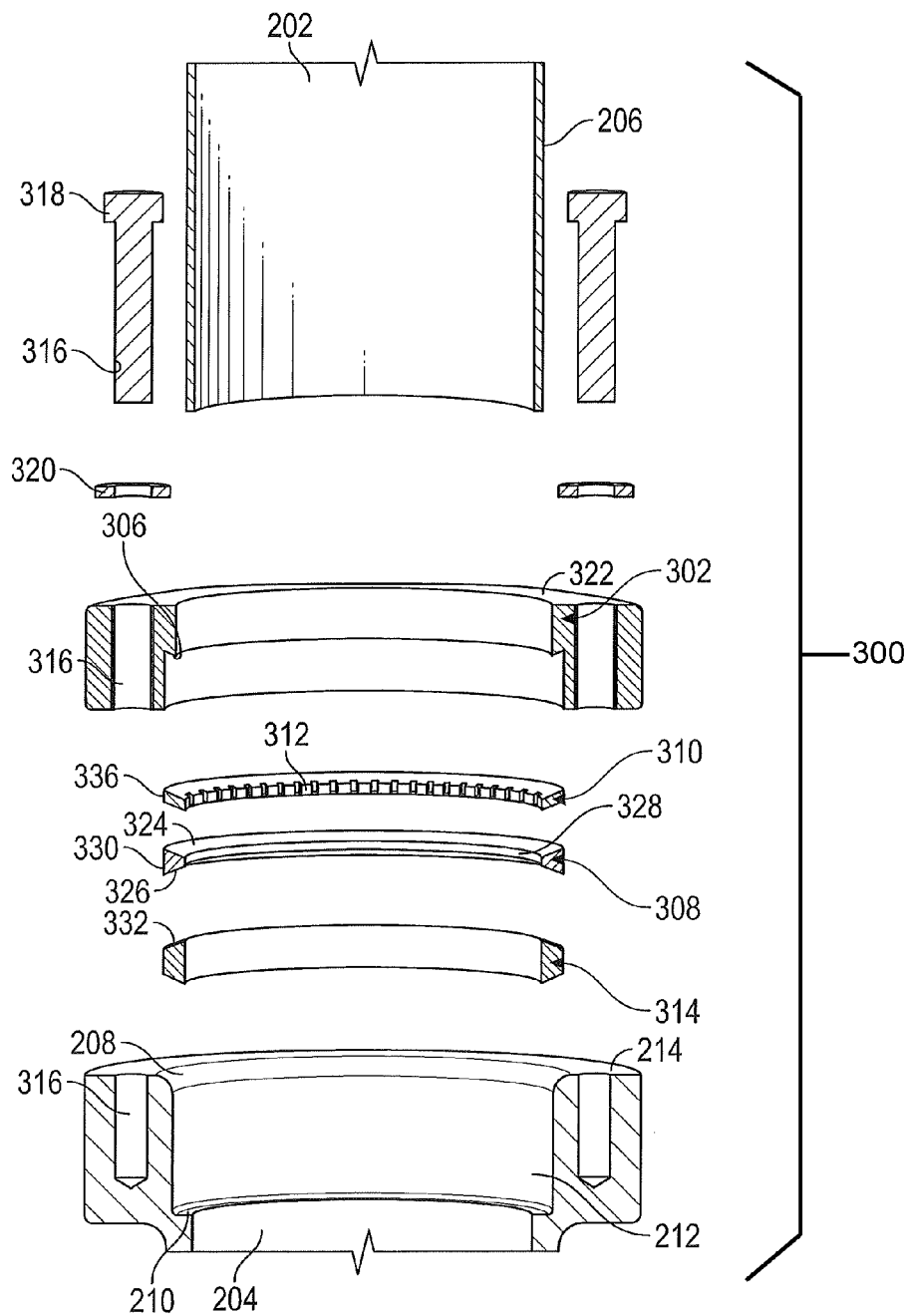
FIG. 5A illustrates an exploded view of the tube seal assembly according to aspect of the disclosure.

The seal guard 308 is configured to protect the elastomeric seal 314 against the teeth 312 of the tube retainer 310 and be constructed in various geometries for the purpose of poka-yoke. That is, geometry designed so as to prevent incorrect assembly by the user. The seal guard 308 can be constructed to include a taper having its widest point at the outer surface 330 and tapers to smaller point that ends in the inner surface 328 (FIG. 5A). The angle of the taper allows the lower surface 326 of the seal guard 308 to better mate with the angled upper surface 332 of the elastomeric seal. Upper surface 324 of the seal guard 308 may be generally flat or can be constructed to have a similar opposing surface as a lower surface 336 of the tube retainer 310. The seal guard 308 may be made of any material including hard nylon or hard polymer material. In one aspect, similar to the locking flange 302, and the tube retainer 310, the seal guard 308 may be swivelly connected together at one portion so that instead of sliding over one of the tube, it can swivel open and then close around the relevant tube during installation. In another aspect, the seal guard 308 can be cut so that (because it can be made from a relatively malleable material) the seal guard can be open and bent around the tube 202.

The elastomeric seal 314 may be made from rubber or other elastomeric material and can be shaped trapezoidally, triangularly, squarely, roundly or other shapes. A trapezoid shaped elastomeric seal 314 may require that the seal guard's 308 shape is configured to receive the elastomeric seal. That is the lower surface 326 of the seal guard 308 is shaped similar to the upper surface 332 of the elastomeric seal 314. The purpose of the elastomeric seal 314 is to form a main seal with the tube 202 and adapter 204 and prevent fluids from leaking at the connection point.

It should be noted, that although fluids are discussed herein for a vehicle and its engine, the tube seal assembly 300 can be used with any type of hoses or tubes that transmit liquids, fluids, and gases that are used in a vehicle, a machine, a house, a building or other structures and devices.

FIG. 5A illustrates an exploded view of the tube seal assembly 300 according to aspect of the disclosure. Tube 202 along with the tube seal assembly 300 are shown before being connected to the adapter 204. In one aspect, tube 202 may be inserted into the bore 212 of the adapter 204 and is prevented from being inserted further than necessary by a tube shoulder 210 that has a smaller inner diameter than the inner diameter of the tube 202. Then, components of the tube seal assembly 300 may be assembled in order to connect the tube 202 to the adapter 204. The elastomeric seal 314 may be placed around tube 202 and seated on elastomeric seal shoulder 208 of the adapter 204. As the elastomeric seal 314 may be trapezoidal shape, the elastomeric seal shoulder 208 can be configuredly shaped to receive the trapezoidal shaped elastomeric seal 314 or the elastomeric seal shoulder 208 can be configuredly shaped to receive any shaped elastomeric seal. Next, the seal guard 308 may be placed on top of the elastomeric seal 314 in order to protect the elastomeric seal 314 from being damaged by the teeth 312 of the tube retainer 310. The tube retainer 310 may be placed on top of seal guard 308 and the teeth 312 may come into contact with an outer surface 206 of the tube 202. The teeth 312 will further "dig" into the outer surface 206 in the event that the tube 202 moves in a first direction during a blowout. Next, locking flange 302 may be placed on top of the tube retainer 310. The tube retainer 310, the seal guard 308 and the elastomeric seal 314 may be received under shoulder 306 of the locking flange 302. Washer 320 may be placed on the upper surface 322 of the locking flange 302 to receive bolts 318. Bolts 318 may also be received in bolt receiving portion 316. The bolts 318 may be any device that clamps components of the tube seal assembly 300 together and can be bolts, screws and the like. The bolts 318 may be rotated or screwed into place through various means known in the art.

In one aspect of the disclosure, before the tube 202 is inserted into the bore 212 of the adapter 204, the assembling, as discussed above, of the tube seal assembly 300 can occur and the assembled tube seal assembly can be coupled to the upper surface 214 of the adapter 204. Thus, with this aspect, the repairs to be completed faster as the components of the tube seal assembly 300 are mainly assembled and only needs the tightening of the bolts in order to complete the repair. In other aspects, some or all of the components may be preassembled during manufacturing of the tube seal assembly, such as through gluing and other known methods. At this point, however, the bolts 318 and washer are not used until tube 202 is inserted into bore 212 as shown inn FIG. 5B.

Figure 5B:
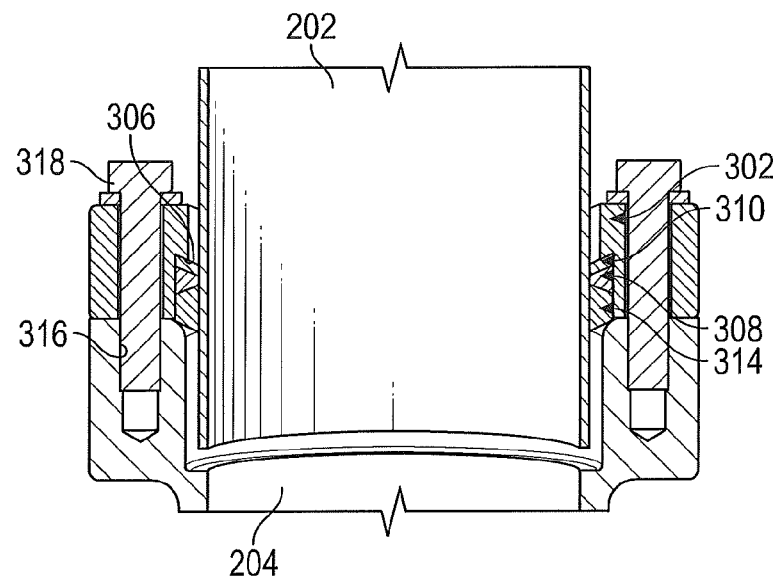
FIG. 5B illustrates the tube seal assembly being coupled to the tube and adapter according to an aspect of the disclosure.

FIG. 5B illustrates the tube seal assembly 300 being coupled to the tube 202 and adapter 204 according to an aspect of the disclosure. The tube seal assembly 300 is shown being positioned on the same axis as the tube and the adapter. The bolts will also be tightened along the same axis as the tube and the adapter. With the tube 202 positioned within the bore 212 of the adapter 204, the bolts 318 may be tighten within the bolt receiving portion 316 in order to complete the repairs or as part of the original assembly of the connection. As the bolt 318 is tightened, the load provided by the tightening of the bolt is transferred to the locking flange 302. In particular, the shoulder 306 of the locking flange 302 can apply the load provided by bolts 318 to the tube retainer 310, the seal guard 308 and the elastomeric seal 314 that are positioned directly under the shoulder. Thus, the load helps to keep the components of the tube seal assembly 300 together and in a compressed state (FIGS. 6A and 6B) in order to properly connect the tube and the adapter and in order to provide the necessary seal and blowout protection.

Figure 6A:
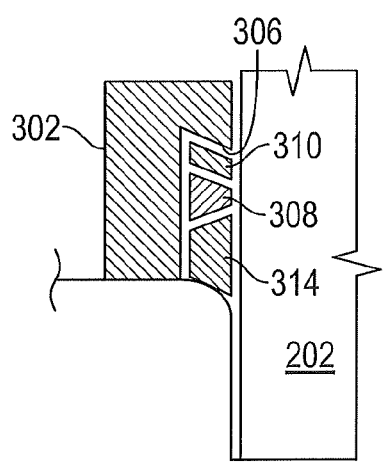
FIG. 6A illustrates a cross section of the tube seal assembly before a load is applied, according to an aspect of the disclosure.
Figure 6B:
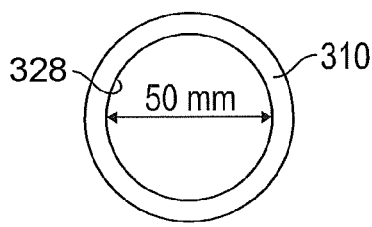
FIG. 6B illustrates a plan view of a tube retainer before a load is applied, according to an aspect of the disclosure.
Figure 7A:
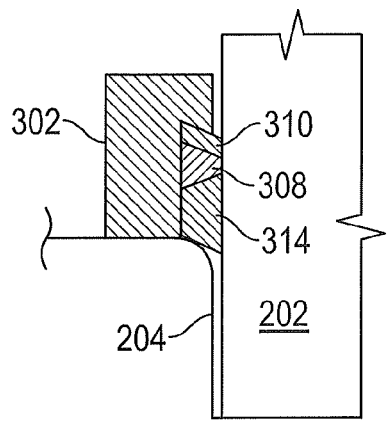
FIG. 7A illustrates a cross section of the tube seal assembly after a load is applied, according to an aspect of the disclosure.
Figure 7B:
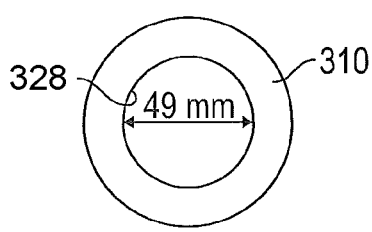
FIG. 7B illustrates a plan view of a tube retainer after a load is applied, according to an aspect of the disclosure.

FIGS. 6A and 6B illustrate the components of the tube seal assembly 300 before and after the load is applied. FIG. 6A shows the tube retainer 310, the seal guard 308 and the elastomeric seal 314 received under shoulder 306 of the locking flange 302. At this point, these components are in the uncompressed state as a load has not been applied to them. For example, the tube retainer 310 and the other components may be in a uncompressed state having the inner diameter 328 being about 50 mm. However, various inner diameter sizes may be utilized depending on the outer diameter of the tube 202. Once the load is applied through the use of bolts 318 (as stated above), the components will be in a compressed or deformed state as shown in FIG. 6B. In the compressed state, the inner diameter of tube retainer 310 and the other components will decrease to, for example, 49 mm so that a better friction fit seal is formed with the outer diameter 206 of the tube 202. The compressed state also assist to keep the tube 202 in place during a blowout.

With the tube seal assembly 300 installed at the connection between the tube and the adapter, the tube seal assembly 300 provides a leak free and reliable connection without the need of having double upsets formed at the end of the tube or any other end forming process. This saves time and production costs of the tube. Further, the tube seal assembly 300 provides better blowout protection than the prior art system and thereby decreasing downtime of the engine for repairs. The tube seal assembly 300 can be configured to connect tubes of various sizes because it allows for greater misalignments due to different manufacturing tolerances of the tube 202 and the adapter 204 so that repairs to currently used tubes can be done in the field. Further, because the bolt 318 secures the tube seal assembly 300 to the adapter, any vibrations during fluid circulation are minimized.

As discussed herein, the locking flange 302, the tube retainer 310, the seal guard 308 and alternatively, the elastomeric seal 314 can be designed with a hinge connection so that they can be assembled by opening the respective component up and placed around the tube and then closed back together with the known fastening device. In this aspect, components of the tube seal assembly do not have to be assembled in a particular order, for example, the order discussed above. That is, the elastomeric seal 314 is placed on the upper surface 214 of the adapter 204, then the seal guard 308 is placed on top of the elastomeric seal, followed by the tube retainer 310 and finally the locking flange 302 on top of the tube retainer 310.

INDUSTRIAL APPLICABILITY

An improved connector for connecting tubes of a combustion engine is provided. Combustion engines require fluids including gases to circulate within hoses and tubes in order to function properly. For example, the operating temperature of the combustion engine must be maintained within a certain range of temperatures and thus, the coolant fluid can be used to maintain the engine's temperature within the operating range. The coolant fluid can be circulated under pressure in tubes that are connected together throughout the engine and the vehicle.

As the cooling fluid is circulated under pressure, leaks can occur at the connection due to weakening of the tube end over time due to normal usage. Leaks can also occur when there is a blowout due to a fatigued portion of one or more of the tubes. The tube seal assembly 300 can include various components such as the locking flange 302, the tube retainer 310, the seal guard 308, and the elastomeric seal 314. Bolts 318 are used to secure the components of tube seal assembly 300 together through the use of a load and to secure the tube seal assembly to the adapter 204.

The tube seal assembly 300 provides a leak free and reliable connection without the need of having double upsets formed at the end of the tube or other end forming process, thereby reducing manufacturing costs. Further, the tube seal assembly 300 provides better blowout protection than the prior art system and thereby decreasing downtime of the engine for repairs. The tube seal assembly 300 can be configured to connect tubes of various sizes so that repairs to currently used tubes can be done in the field rather installing new tubes as part of the repair process. The tube seal assembly 300 also makes the connection impervious to dirt and contamination found in off-highway use of the vehicle. Further, because the bolt 318 secures the tube seal assembly 300 to the adapter, any vibrations during fluid circulation are minimized.

We claim:

1. A tube seal assembly, comprising:
an elastomeric seal configured to provide a seal between a tube and an adapter;
a tube retainer having at least one tooth configured to mate with the tube, the at least one tooth being deformable from a first angle to a second angle during insertion of the tube into the adapter;
a seal guard configured to protect the elastomeric seal from being damaged by the at least one tooth;
a locking flange having a shoulder and a bolt receiving portion, wherein the elastomeric seal, the tube retainer, and the seal guard are positioned under the shoulder of the locking flange; and
a bolt configured to fit in the bolt receiving portion and apply a load to the shoulder of the locking flange,
wherein the tube retainer is disposed between the locking flange and the elastomeric seal along a longitudinal direction of the tube seal assembly, and
wherein the at least one tooth projects toward the locking flange along the longitudinal direction as the at least one tooth projects radially inward along a radial direction when the at least one tooth is disposed according to the first angle, the radial direction being transverse to the longitudinal direction.

2. The tube seal assembly of claim 1, wherein the shoulder applies the load and compresses the tube retainer, the seal guard, and the elastomeric seal.

3. The tube seal assembly of claim 1, wherein the at least one tooth projects away from the locking flange along the longitudinal direction as the at least one tooth projects radially inward along the radial direction when the at least one tooth is disposed according to the second angle.

4. The tube seal assembly of claim 1, wherein the at least one tooth contacts, at the first angle, an outer surface of the tube during an initial insertion and then deforms to the second angle after completion of the insertion of the tube into a bore of the adapter.

5. The tube seal assembly of claim 1, wherein the at least one tooth prevents separation of the tube from the adapter during a blowout.

6. The tube seal assembly of claim 1, wherein the tube seal assembly is positioned circumferentially around the tube.

7. The tube seal assembly of claim 1, wherein the elastomeric seal has one of a trapezoidal shape, a triangular shape, a square shape, and a round shape.

8. The tube seal assembly of claim 1, wherein the elastomeric seal has a trapezoidal cross-sectional shape, and
wherein a lower surface of the tube retainer is angled to correspondingly mate with an upper surface of the trapezoidal cross-sectional shape of the elastomeric seal.

9. The tube seal assembly of claim 1, wherein the seal guard is tapered along the radial direction.

10. The tube seal assembly of claim 1, wherein the shoulder of the locking flange extends toward the elastomeric seal along the longitudinal direction as the shoulder of the locking flange extends radially inward along the radial direction.

11. A tube seal assembly for connecting a tube with an adapter, the tube seal assembly comprising:
an elastomeric seal configured to provide a seal between the tube and the adapter, wherein the elastomeric seal receives the tube;
a tube retainer having at least one tooth that mates with the tube, the at least one tooth being deformable from a first angle to a second angle during an insertion of the tube into the adapter;
a seal guard configured to protect the elastomeric seal from being damaged by the at least one tooth and to receive the tube;
a locking flange having a shoulder and a bolt receiving portion, the locking flange being configured to receive the tube, wherein the elastomeric seal, the tube retainer, and the seal guard are positioned under the shoulder of the locking flange; and
a bolt configured to fit in the bolt receiving portion and apply a load to the shoulder of the locking flange,
wherein the tube seal assembly is positioned on a same axis as the tube and adapter, the same axis extending along a longitudinal direction,
wherein the tube retainer is disposed between the locking flange and the elastomeric seal along a longitudinal direction of the tube seal assembly, and
wherein the at least one tooth projects toward the locking flange along the longitudinal direction as the at least one tooth projects radially inward along a radial direction when the at least one tooth is disposed according to the first angle, the radial direction being transverse to the longitudinal direction.

12. The tube seal assembly of claim 11, wherein the shoulder applies the load and compresses the tube retainer, the seal guard, and the elastomeric seal.

13. The tube seal assembly of claim 11, wherein the at least one tooth projects away from the locking flange along the longitudinal direction as the at least one tooth projects radially inward along the radial direction when the at least one tooth is disposed according to the second angle.

14. The tube seal assembly of claim 11, wherein the at least one tooth contacts, at the first angle, an outer surface of the tube during an initial insertion and then deforms to the second angle after completion of the insertion of the tube into a bore of the adapter.

15. The tube seal assembly of claim 11, wherein the at least one tooth prevents separation of the tube from the adapter during a blowout.

16. The tube seal assembly of claim 11, wherein the seal guard prevents separation of the tube from the adapter during a blowout.

17. The tube seal assembly of claim 11, wherein the elastomeric seal has a trapezoidal cross-sectional shape.

18. The tube seal assembly of claim 17, wherein a lower surface of the tube retainer is angled to correspondingly mate with an upper surface of the trapezoidal cross-sectional shape of the elastomeric seal.

19. The tube seal assembly of claim 11, wherein the seal guard is tapered along the radial direction.

20. The tube seal assembly of claim 11, wherein the shoulder of the locking flange extends toward the elastomeric seal along the longitudinal direction as the shoulder of the locking flange extends radially inward along the radial direction.

* * * * *